United States Patent [19]

Fujisaki et al.

[11] Patent Number: 4,473,527

[45] Date of Patent: Sep. 25, 1984

[54] METHOD AND APPARATUS FOR FORMING INFLATION FILM

[75] Inventors: Takumi Fujisaki; Toshiro Ozaki, both of Yamaguchi; Tadao Adachi, Showa, all of Japan

[73] Assignees: Mitsui Petrochemical Industries Ltd.; Placo Co., Ltd., both of Japan

[21] Appl. No.: 438,707

[22] Filed: Nov. 2, 1982

[30] Foreign Application Priority Data

Nov. 9, 1981 [JP] Japan ................................ 56-179346

[51] Int. Cl.³ ............................................ B29D 7/22
[52] U.S. Cl. .................................... 264/566; 264/569; 425/72 R; 425/326.1
[58] Field of Search ....................... 264/569, 563–568, 264/237; 425/72 R, 326.1

[56] References Cited

U.S. PATENT DOCUMENTS

| | | | |
|---|---|---|---|
| 3,307,218 | 3/1967 | Reifenhauser | 425/326.1 |
| 3,709,290 | 1/1973 | Upmeier | 34/104 |
| 3,775,523 | 11/1973 | Haley | 425/326.1 |
| 3,835,209 | 9/1974 | Karabedian | 425/326.1 |
| 3,930,768 | 1/1976 | Zimmermann et al. | 425/72 R |
| 3,976,411 | 8/1976 | Rahefs et al. | 425/326.1 |
| 4,115,048 | 9/1978 | Alderfer et al. | 425/326.1 |
| 4,165,356 | 8/1979 | Heider | 264/565 |
| 4,330,501 | 5/1982 | Jones et al. | 425/72 R |

FOREIGN PATENT DOCUMENTS

| | | |
|---|---|---|
| 1917914 | 10/1970 | Fed. Rep. of Germany . |
| 1629798 | 2/1971 | Fed. Rep. of Germany . |
| 2256942 | 5/1974 | Fed. Rep. of Germany ... 425/326.1 |
| 2524281 | 2/1976 | Fed. Rep. of Germany . |
| 2725832 | 12/1978 | Fed. Rep. of Germany ... 425/326.1 |
| 53-5340 | 2/1978 | Japan ................................. 264/564 |
| 53-146764 | 12/1978 | Japan . |
| 57-26206 | 6/1982 | Japan . |
| 432813 | 9/1967 | Switzerland . |
| 1045899 | 10/1966 | United Kingdom . |
| 1229065 | 4/1971 | United Kingdom . |
| 1326771 | 8/1973 | United Kingdom . |
| 1396749 | 6/1975 | United Kingdom . |
| 1469211 | 4/1977 | United Kingdom . |
| 1532929 | 11/1978 | United Kingdom . |
| 1546048 | 5/1979 | United Kingdom . |

Primary Examiner—Jeffery Thurlow
Attorney, Agent, or Firm—Cushman, Darby & Cushman

[57] ABSTRACT

In the manufacture of an inflation film for forming a thermoplastic resin having a melt tension of not more than 4 g into a tubular bubble, a tubular bubble extruded from an extruding nozzle is cooled from the inner circumferential surface thereof by air supplied from a first air supply opening. The outer circumferential surface of the bubble is cooled with air from a first external air-cooling ring arranged at the outside of the bubble. The first air-cooling ring has a guide plate for guiding the bubble, a second air supply opening for supplying air between the guide plate and the bubble from an inlet port arranged at the lower end of the guide plate, and a third air supply opening for supplying air to the bubble from an outlet port arranged at the upper end of the guide plate. The bubble which is cooled by the first external air-cooling ring is further cooled by the air supplied from a second external air-cooling ring. The bubble is solidified.

19 Claims, 9 Drawing Figures

METHOD AND APPARATUS FOR FORMING INFLATION FILM

BACKGROUND OF THE INVENTION

The present invention relates to a method and an apparatus for forming an inflation film and, more particularly, to a method and an apparatus for forming an inflation film by air-cooling a thermoplastic resin having a melt tension of not more than 4 g.

Low or medium pressure process thermoplastic resins such as homopolymers of ethylene or copolymers thereof with α-olefins generally have a smaller melt tension than, for example, high pressure process low-density polyethylenes. The thermoplastic resins which have a small melt tension have a narrow molecular-weight distribution and a smaller number of long-chain branches. For these reasons, when a bubble (tubular film) is formed from a melted thermoplastic resin having such a small melt tension in the manufacturing step of an inflation film, it has poor resistance to air pressure, that is, poor shape retaining force. More specifically, when air is blown toward a bubble at a relatively high velocity, the bubble may flap or sway, or necking may occur, which results in producing a defective product or preventing further forming.

In a conventional method for molding an inflation film by forming a thermoplastic resin having a small melt tension, the velocity of a gas flow for cooling cannot be increased above a predetermined value, unlike in the case of a high pressure process low-density polyethylene. Therefore, the forming rate is extremely low, that is, the productivity of the inflation film is low.

When a film of 30 to 50 μ in thickness is formed from a high pressure process low-density polyethylene, the forming speed is generally about 50 to 60 m/min. However, when a film of the same thickness is to be produced from a thermoplastic resin having a melt tension of not more than 4 g, only a maximum molding speed of about 20 m/min may be obtained. If the thermoplastic resin having a small melt tension is formed at a speed exceeding about 20 m/min, the air velocity for cooling the bubble must also be increased. However, if the air velocity for cooling is increased during forming of the thermoplastic resin having a small melt tension, the bubble may flap or a neck may be formed in the bubble, which results in defective products or prevention of further forming.

Figure 1:
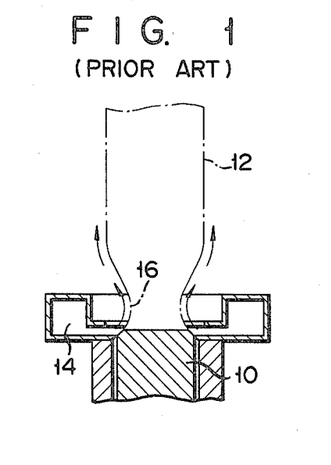
FIGS. 1 to 4 are schematic sectional views showing conventional apparatuses for forming an inflation film.

FIG. 1 shows one conventional method for forming an inflation film. According to this method, in order to cool the bubble, air is blown from an external air-cooling ring 14 along the outer circumferential surface of a bubble 12, which is taken off from a die 10. When the air velocity toward the bubble 12 is increased in this method, a neck 16 is formed in the bubble to decrease the heat-exchange area (area for exchanging heat). In some cases, on increase in the air velocity toward the bubble 12 results in prevention of further forming. Thus, the air velocity cannot be increased above a predetermined value. Since it takes a considerable amount of time to cool the bubble, the forming rate of a thermoplastic resin having a small melt tension cannot be increased. In order to form a film of 50 μ thickness from an ethylene-α-olefin copolymer, a maximum air velocity is 15 m/sec and a maximum molding speed is 20 m/min.

Figure 2:
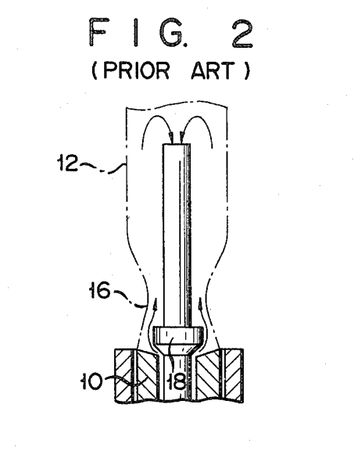

FIG. 2 shows another conventional method wherein an air-cooling ring 18 is arranged inwardly of a bubble 12. Air from the air-cooling ring 18 is blown along the inner circumferential surface of the bubble 12 so as to cool the bubble 12 which is being taken off from a die 10. In this conventional method, if the air velocity is increased to exceed a predetermined value, the interior of the bubble is kept at a reduced pressure to form a neck 16 again. Thus, the air velocity for cooling the bubble cannot be increased above a predetermined value in this method, either. In other words, the forming rate of the thermoplastic resin having a small melt tension cannot be increased. In order to form a film of 50 μ thickness from an ethylene-α-olefin copolymer, a maximum air velocity of 14 m/sec and a maximum forming rate is 15 m/min.

Figure 3:
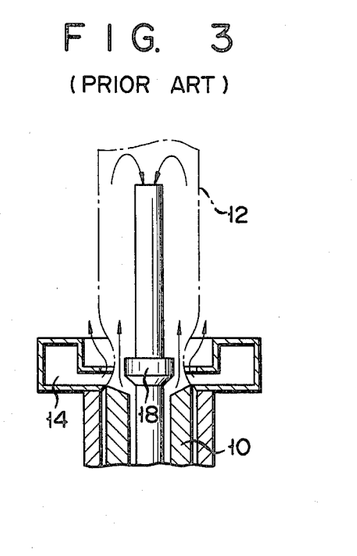

FIG. 3 shows yet another conventional method wherein a combination of the external cooling method shown in FIG. 1 and the internal cooling method shown in FIG. 2. Even with this conventional method shown in FIG. 3, a maximum forming rate of only 35 m/min may be obtained, which is the sum of the maximum forming rate of the external cooling method which is 20 m/min and the maximum forming rate of the internal cooling method which is 15 m/min. If the forming rate is increased above 35 m/min in this method by increasing the air velocity, a sharp neck is formed to make any further resin forming impossible.

Figure 4:
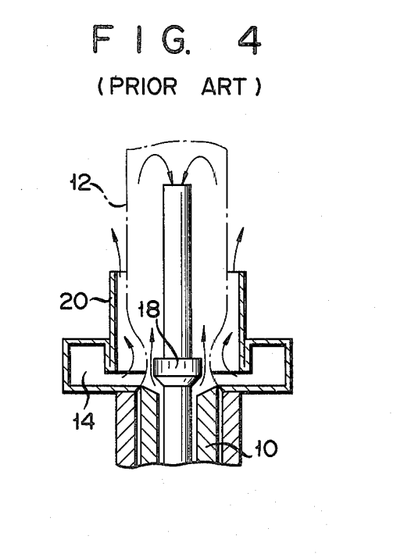

According to yet another conventional method shown in FIG. 4, a cylindrical guide plate 20 is arranged outside a bubble 12. According to this method, the inside of the guide plate 20 is subject to a reduced pressure as the velocity of air for external cooling is increased. This reduced pressure causes flapping of the bubble 12 to cause the bubble 12 to contact with the guide plate 20. For this reason, the air velocity cannot be increased; thus the forming rate cannot be increased. In order to form a film of 50 μ thickness from an ethylene-α-olefin copolymer, a maximum forming rate is 30 m/min.

The air velocity used herein is a value measured with a hot-wire anemometer at the blowing port of the air-cooling ring.

The melt tension used herein is a physical value which is measured with a "melt tension tester" type II (product manufactured by Toyo Seiki Seisakusho K.K.) under the following conditions:

Nozzle shape: 2.09 mm diameter; 8.0 mm length
Piston transfer speed: 15 mm/min
Extrusion temperature: 190° C. for ethylene resin; 230° C. for propylene resin
Take-off speed: 45 m/min
Tension measurement point: 500 mm below the nozzle According to this measurement method, the tension of a thread-like resin body which is taken off from a nozzle is measured with a tension tester at a point 500 mm below the nozzle.

SUMMARY OF THE INVENTION

In forming an inflation film from a thermoplastic resin having a melt tension of not more than 4 g, it is required to efficiently cool a bubble without causing flapping in order to increase productivity. More specifically, in order to increase cooling efficiency while keeping the bubble in a stable state, the following conditions must be satisfied:

(a) An increase in the heat-exchange area.

(b) An increase in the velocity of the cooling air to be blown against the bubble.

(c) Stabilization of the bubble; prevention of formation of a neck or flapping.

It is an object of the present invention to provide a method and an apparatus for forming an inflation film wherein the productivity of inflation film from a thermoplastic resin having a melt tension of not more than 4 g is increased by satisfying the conditions (a), (b) and (c) above.

According to an aspect of the present invention, there is provided an apparatus for forming a thermoplastic resin having a melt tension of not more than 4 g into a tubular bubble having inner and outer circumferential surfaces, which comprises supplying means for supplying the molten resin, extruding means for extruding the supplied molten resin into a form of the tubular bubble, first cooling means for cooling the bubble by supplying a gas toward the inner circumferential surface of the bubble in the molten state, second cooling means, disposed in the vicinity of both said extruding means and said first cooling means, for cooling the bubble in the molten state, said second cooling means having guiding means for guiding the bubble along an inner surface thereof from an inlet port for receiving the bubble toward an outlet port for discharging the bubble, first gas supplying means for supplying the gas from said inlet port along the inner surface of said guiding means, and second gas supplying means for supplying the gas from said outlet port toward the outer circumferential surface of the bubble, the inner surface of said guiding means defining a space into which the molten bubble is extruded by said extruding means and third cooling means for cooling the bubble by supplying the gas to the molten bubble which is cooled by said first and second cooling means, thereby the bubble being solidified.

DETAILED DESCRIPTION OF THE PREFERRED EMBODIMENT

An embodiment of the present invention will now be described with reference to FIGS. 5 to 9.

Figure 5:
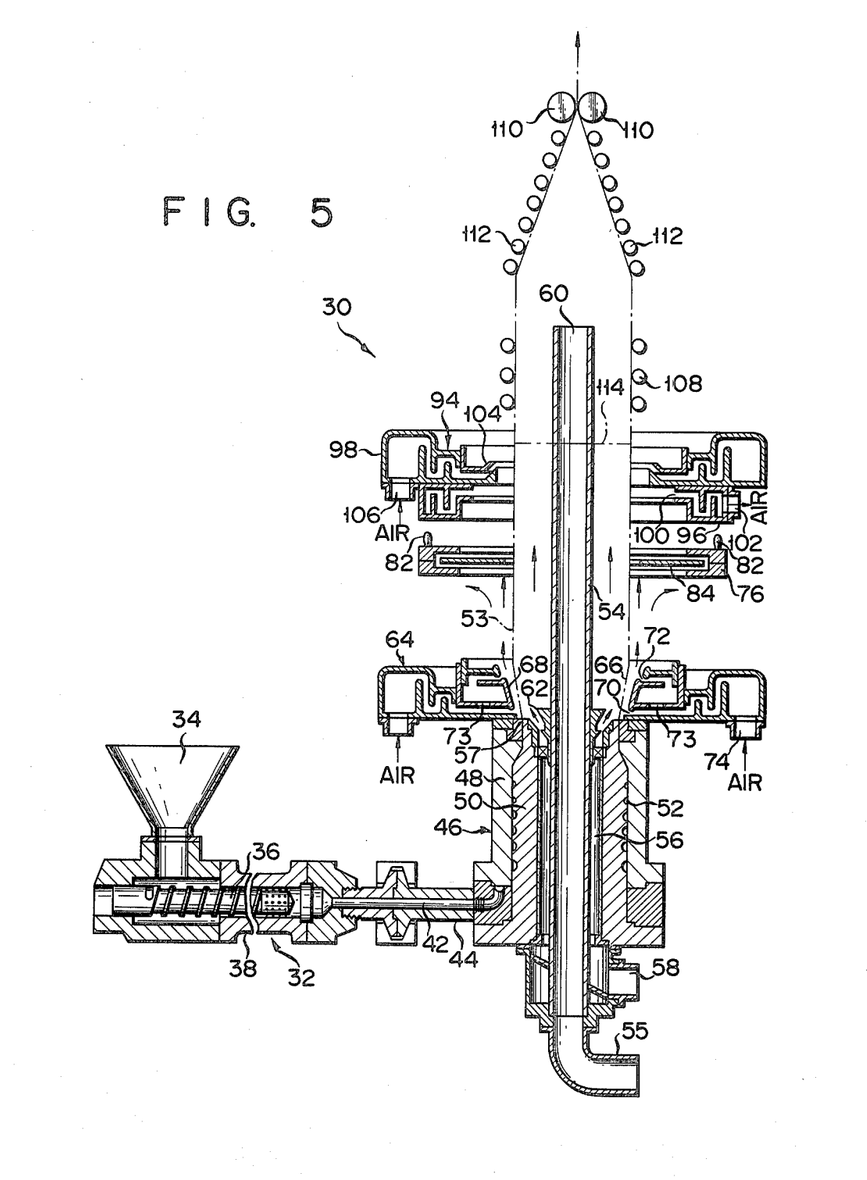
FIG. 5 is a sectional view of an apparatus for forming an inflation film according to an embodiment of the present invention.

As shown in FIG. 5, in an inflation film forming apparatus 30, a hopper 34 for feeding a granular thermoplastic resin is mounted on an extruder 32. A barrel 38 for extruding the thermoplastic resin is arranged below the hopper 34. A screw 36 is arranged inside the barrel 38. The resin fed from the hopper 34 is fed toward a die 46 to be described later upon the rotation of the screw 36. A heater (not shown) is provided around the barrel 38 to melt the thermoplastic resin which passes inside the barrel 38. The molten resin is supplied to the die 46 through a member 44 defining a path 42.

The die 46 has an outer die 48 of cylindrical shape, and an inner die 50 arranged inside the outer die 48 to be concentrical therewith. The inner and outer dies 50 and 48 define therebetween a gap 52 to allow upward flow of the molten resin. An extrusion nozzle 57 is formed at the upper end of the gap 52, and the molten resin extruded from the extrusion nozzle 57 forms a cylindrical bubble 53 in the form of a thin film as indicated by a broken line in the figure. An exhaust pipe 54 is arranged along the longitudinal axis of the inner die 50, and has a suction opening 60 for suction of supplied air and an exhaust opening 55 for exhausting the sucked air. Although not shown in the figure, the exhaust opening 55 is connected to a vacuum source at a position below the die 46. The suction opening 60 is preferably located at a position 50 to 800 mm above a frost line 114 to be described later. An air path 56 for supplying air to cool the inner circumferential surface of the bubble 53 is interposed between the exhaust pipe 54 and the inner die 50. A first air supply opening 62 for blowing air along the inner circumferential surface of the bubble 53 is formed at the upper end of the air path 56. A blower (not shown) is connected to a lower end 58 of the air path 56.

A first external air-cooling ring 64 for cooling the bubble 53 by blowing air along the outer circumferential surface of the bubble 53 is arranged at the upper end of the die 46. A guide plate or inner surface 68 is arranged inside the first external air-cooling ring 64 to surround the bubble 53, thereby defining an upwardly expanding space. An inlet port 68A and an outlet port 68B are formed at the lower and upper ends, respectively, of the guide plate 68. A second air supply opening 70 and a third air supply opening 72 are formed along the inner peripheries of the inlet and outlet ports 68A and 68B, respectively, so as to blow air toward a tapered section 66 of the bubble 53. A plurality of intake openings 74 for intake of air are formed along the outer periphery of the first external air-cooling ring 64. The intake openings 74 and the second and third air supply openings 70 and 72 are connected through an air path 73. The intake openings 74 are connected to a flower (not shown).

Figure 6:
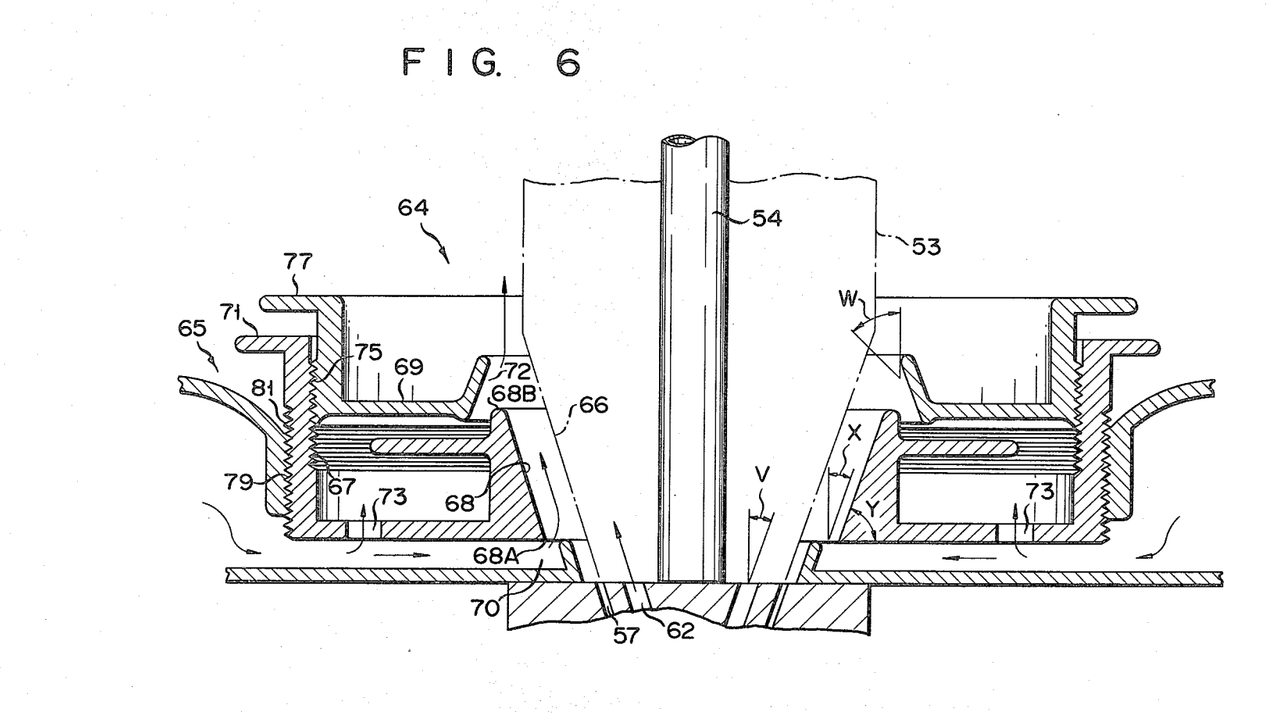
FIG. 6 is a sectional view showing an air-blowing section of a first air-cooling ring shown in FIG. 5.

The first, second and third air supply openings 62, 70 and 72 will now be described in more detail with reference to FIG. 6.

Angle V formed by the longitudinal axis of the hole formed in the first air supply opening 62 and the longitudinal axis of the bubble 53 is preferably 30 to 75°; it is 45° in this embodiment. When the angle V is 45°, the molten resin (bubble) extruded from the extrusion nozzle 57 is expanded outward, that is, toward the guide plate 68. The air from the first air supply opening 62 maintains an equilibrium with the air from the second air supply opening 70 to form the tapered section 66 of the bubble 53 while the inner circumferential surface of the tapered section 66 is cooled.

Angle X formed by the longitudinal axis of the hole formed in the second air supply opening 70 and the longitudinal axis of the bubble 53 is preferably 0° to 10°; it is 6° in this embodiment. When the angle X is 6°, the molten resin (bubble), which is extruded from the extrusion nozzle 57 and is expanded inward, is kept in the stable state. The air from the second air supply opening 70 maintains an equilibrium with the air from the first air supply opening 62 to form the tapered section 66 while the outer circumferential surface of the tapered section 66 is cooled. The air from the second air supply opening 70 is guided upward by the guide plate 68 and the bubble 53 with the neck 66.

Angle Y formed by the guide plate 68 and the axis crossing the longitudinal axis of the bubble in a right angle is preferably 60° to 89°; it is 84° in this embodiment.

Angle W formed by the central axis of the hole formed in the third air supply opening 72 and the longitudinal axis of the bubble 53 is preferably 90°. When the angle W is 90°, the bubble 53 is urged inward so that the tapered section 66 of the bubble 53 may not contact the guide plate 68 while the tapered section 66 is being cooled.

Since the first, second and third air supply openings form the angles V, X and W, the tapered section 66 of the bubble 53 may not contact the guide plate 68. Furthermore, since the inner and outer circumferential surfaces of the tapered section 66 of the bubble 53 are cooled simultaneously, the heat-exchange area may be increased, and formation of pleats or wrinkles due to temperature difference between the inner and outer circumferential surfaces is prevented. Due to the equilibrium between the amounts of air supplied from inside and outside the bubble 53, the amount of air used to cool the tapered section 66 may be increased without causing flapping of the tapered section 66.

An air adjusting mechanism 65 will be described with reference to FIG. 6, which adjusts the amounts of air supplied from the second and third air supply openings 70 and 72 formed in the first external air-cooling ring 64, respectively. A first handle 71 with first threads 67 and fourth threads 81 is formed integrally with the guide plate 68. A second handle 77 with second threads 75 is formed integrally with an upper plate 69 which, together with the upper end of the guide plate 68, defines the third air supply opening 72. The second threads 75 can mesh with the first threads 67. Third threads 79 which can mesh with the fourth threads 81 are formed on one side of the first external air-cooling ring 64 which is located adjacent to the first handle 71. The first handle 71 is rotated about the longitudinal axis of the bubble in order to adjust the amount of air to be supplied from the second air supply opening 70. Then, the first handle 71 moves vertically, and the gap of the second air supply opening 70 changes. The amount of air to be supplied from the second air supply opening 70 can be adjusted. The second handle 77 is rotated about the axis of the bubble in order to adjust the amount of air to be supplied from the third air supply opening 72. Then, the second handle 77 moves vertically, and the gap of the third air supply opening 72 changes. In this manner, the amount of air to be supplied from the third air supply opening 72 can be adjusted.

As shown in FIG. 5, an iris diaphragm 76 as a regulating member for regulating the flapping of the bubble is arranged above the first external air-cooling ring 64, preferably midway between the first external air-cooling ring 64 and a second external air-cooling ring 98.

Figure 7:
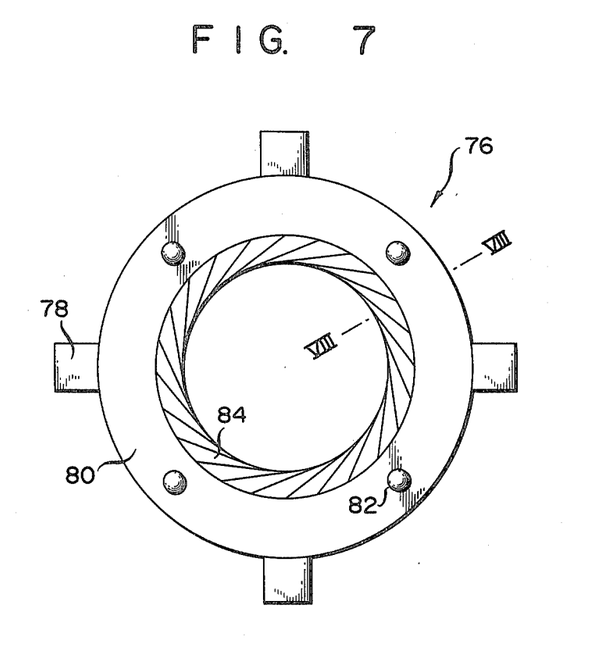
FIG. 7 is a plane view showing a regulating ring of the apparatus shown in FIG. 5.
Figure 8:
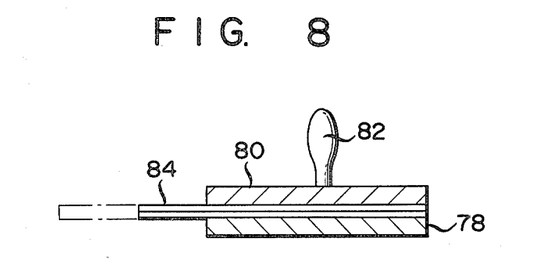
FIG. 8 is a sectional view of the regulating ring along the line VIII—VIII in FIG. 7.
Figure 9:
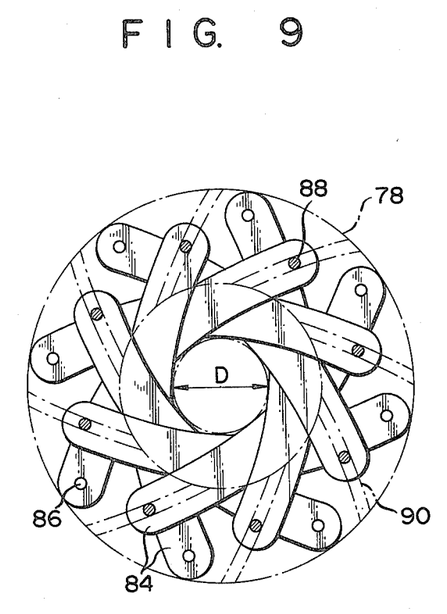
FIG. 9 is a plan view of blades of the regulating ring shown in FIG. 7.

As shown in FIGS. 7 to 9, the iris diaphragm 76 has an annular base 78 and a rotary ring 80 which has the same inner diameter as that of the annular base 78 and which is rotatable. The rotary ring 80 is formed in an annular shape which has the same inner diameter as that of the annular base 78. A handle 82 for rotating the rotary ring 80 is mounted on the upper surface of the rotary ring 80. A plurality of blades 84 which are capable of extending toward the center of the central hole of the rotary ring 80 upon rotary movement of the rotary plate 80 are arranged between the annular base 78 and the rotary ring 80. As shown in FIG. 9, each blade 84 is arranged in an arc form and has a first pivot pin 86 fixed to one end portion thereof. The pivot pin 86 is pivotally mounted between the annular base 78 and the rotary ring 80. A second slide pin 88 is formed at the other end of each blade 84. Each second slide pin 88 is slidable along each guide groove 90 formed in the rotary ring 80. A suitable number of blades 84 are arranged to overlap each other in the circumferential direction. With the iris diaphragm 76 of this construction, the inner diameter D may be varied by operating the handle 82.

Referring back to FIG. 5, a cooler unit 94 is arranged above the iris diaphragm 76. The cooler unit 94 has a draft ring 96 for taking in the air which has passed through the space between the iris diaphragm 76 and the bubble, and also has a second external air-cooling ring 98 which is located above the draft ring 96 and which blows air toward the bubble 53 so as to secondarily cool the bubble 53.

A suction opening 100 for intake of the air along the outer circumferential surface of the bubble 53 is formed along the inner circumferential surface of the draft ring 96. An exhaust opening 102 is formed in the outer circumferential surface of the draft ring 96 so as to communicate with the suction opening 100. The exhaust opening 102 is connected to a exhaust pump (not shown).

The second external air-cooling ring 98 is arranged on the draft ring 96 along the outer circumferential surface of the bubble. A fourth air supply opening 104 is formed in the inner circumferential surface of the second external air-cooling ring 98 inwardly of the suction opening 100 of the draft ring 96, that is, at a position closer to the bubble than the suction opening 100. Most of the air which has reached the draft ring 96 is thus guided to the suction opening 100 of the draft ring 96. An intake opening 106 communicating with the fourth air supply opening 104 is formed in the second external air-cooling ring 98. The intake opening 106 is connected to a blower (not shown) for supplying air. The air which is supplied from the first external air-cooling ring 64 and which has cooled the lower portion of the bubble 53 is drawn into the draft ring 96 before it reaches the second external air-cooling ring 98. Then, fresh air is supplied to the bubble 53 from the second external air-cooling ring 98, so that the bubble 53 may be efficiently cooled.

Above the second external air-cooling ring 98 and a frost line 114 to be described later, regulating rollers 108 for regulating flapping of the bubble 53 are arranged in contact with the bubble 53. A pair of pinch rollers 110 for deforming the cylindrical bubble 53 into a flat shape and for clamping it therebetween are arranged above the regulating rollers 108. A plurality of guide rollers 112 for guiding the bubble 53 in contact therewith are arranged along the bubble 53 and between the pinch rollers 110 and the regulating rollers 108.

The mode of operation of the inflation film forming apparatus according to the embodiment described above will now be described.

The molten resin which is fed from the extruder 32 to the die 46 is extruded from the extrusion nozzle 57 through the gap between the outer die 48 and the inner die 50 into a space to form the bubble 53. During the normal operation of the apparatus 30, the bubble 53 is continuously taken off by the pinch rollers 110.

The take-off speed of the pinch rollers 110 determines the forming efficiency of the inflation film. In other words, the forming efficiency of the inflation film per unit time increases with an increase in the take-off speed of the pinch rollers 110.

Air is supplied from the first air supply opening 62 to cool the inner circumferential surface of the tapered section 66 of the bubble 53 which is extruded upward from the extrusion nozzle 57. Simultaneously, air from the second and third air supply openings 70 and 72 formed in the first outer air-cooling ring 64 is supplied to cool the outer circumferential surface of the tapered section 66 of the bubble 53. Although the air supplied from the first, second and third air supply openings 62, 70 and 72 cools the tapered section 66, the tapered section 66 of the bubble 53 is still in the molten state and is not completely solidified yet.

The air supplied from the first to third air supply openings effectively cools the tapered section 66 by keeping an equilibrium to prevent flapping of the tapered section 66. Since the air velocity from the first air supply opening 62 balances with that from the second and third air supply openings, air velocities may be increased. The tapered section 66 of the bubble 53 may be formed in a desired shape by suitably adjusting these air velocities. The ratio of the air velocity from the first air supply opening to that from the first external air-cooling ring 64 is preferably set to be within the range of 1:2 to 2:1. The air supplied from the first air supply opening 62 flows along the inner circumferential surface of the bubble 53 to cool the overall bubble 53 from the inside and is then exhausted from the suction opening 60 at the upper end of the exhaust pipe 54.

The air supplied from the second and third air supply openings 70 and 72 cools the outer circumferential surface of the tapered section 66 and then the outer circumferential surface of the bubble 53 and flows upward therealong.

The air which has cooled the outer circumferential surface of the bubble 53 and which has flown upward is gradually warmed by heat exchange with the bubble, and its cooling function is attenuated. The air which has flown upward along the bubble reaches the iris diaphragm 76. Part of the air abuts against the blades 84 and is deviated from the direction along the bubble 53. The remaining part of the air flows at a high speed in a predetermined gap defined between the blades 84 and the bubble 53. In this manner, since the bubble 53 is supported by air rapidly flowing outside the bubble and air flowing inside the bubble 53, flapping of the bubble 53 is prevented.

The air which has passed through the iris diaphragm 76 then reaches the draft ring 96. The air is then absorbed from the suction opening 100 to be removed from the outside of the bubble 53. In this manner, the draft ring 96 serves to remove the air which has performed heat exchange with the outer circumferential surface of the bubble 53 and which no longer has a cooling function.

Fresh cooling air is subsequently supplied to the bubble 53 from the second external air-cooling ring 98. At the second external air-cooling ring 98, the air is supplied to the bubble 53 from the fourth air supply opening 104.

The frost line 114 is formed in the bubble 53 by being rapidly cooled by fresh air from the second external air-cooling ring 98. A frost line generally indicates the position at which the molten resin starts solidifying. Therefore, the molten resin solidifies at a position above the frost line 114.

When the bubble 53 is rapidly cooled by the air from the second external air-cooling ring 98, it becomes transparent. The level of the second external air-cooling ring 98 is preferably located within 1000 mm from the top surface of the die 46, for preventing breakage of the bubble upon upward taking off of the bubble in the molten form against its own weight when the resin used has a melt tension of not more than 4 g.

The solidified bubble 53 is guided by the regulating rollers 108 and the guide rollers 112 and is taken off by the pinch rollers 110.

A comparison of the forming speeds of the embodiments of the present invention with those of the prior art is shown in Table below. Resin A in Table has a MFR (Melt Flow Index) of 2.1 g/10 min and a density of 0.920 g/cm$^3$. Resin B in Table has a MFR of 1.3 g/10 min and a density of 0.930 g/cm$^3$.

As may be seen from Table below, the forming rate obtainable with the embodiment of the present invention is twice that of the prior art. Accordingly, the embodiment of the present invention can provide an inflation film forming apparatus with a high productivity.

TABLE

| No. | Size Width [mm] × Thickness [μ] | Molding speed [m/min.] | Melt tension [g] | Air velocity Outside [m/sec] | Air velocity Inside [m/sec] | Plastic | |
|---|---|---|---|---|---|---|---|
| I | 500 × 50 | 70 | 0.9 | 25 | 20 | A | Embodiment |
| II | 500 × 50 | 80 | 1.6 | 27 | 21 | B | |
| III | 500 × 30 | 110 | 0.9 | 25 | 20 | A | |
| IV | 500 × 30 | 120 | 1.6 | 27 | 21 | B | |
| V | 500 × 50 | 35 | 0.9 | 15 | 14 | A | Prior art |
| VI | 500 × 30 | 60 | 0.9 | 15 | 14 | A | (shown in FIG. 3) |
| VII | 500 × 50 | 20 | 0.9 | 15 | | A | Prior art |
| VIII | 500 × 30 | 30 | 0.9 | 15 | | A | (shown in FIG. 1) |

As has been described above, according to the embodiment of the present invention, (a) the heat-exchange area can be increased by cooling the bubble 53 from the inside and outside thereof; (b) the amount of air supplied per unit time can be increased by incorporating first and second air-cooling rings so as to supply cooling air twice; and (c) the bubble can be stabilized, and necking or flapping are prevented by incorporating two air supply openings and a guide plate in the first external air-cooling ring and the first supply openings. In this manner, since the three conditions (a) to (c) discussed earlier can be satisfied, the present invention allows forming of an inflation film at a forming speed or with a productivity twice that obtainable with the prior art.

In the embodiment described above, the angle V at which the air is blown from the first air supply opening toward the interior of the bubble 53 is set to be within the range of 30° to 75°. Therefore, the air supplied from the first air supply opening 62 apply the parallel force to the tapered section 66 and the perpendicular force to the tapered section 66. The air equilibrates with the force of the air acting on the outer circumferential surface of the bubble 53. Meanwhile, these air current support the tapered section 66 of the bubble 53.

Since the angle W at which the air is blown from the third air supply opening 72 is set within the range of 70° to 90°, it is prevented to contact between the guide plate 68 and the bubble to which the air is blown from the second air supply opening 70.

The angle X at which the air from the second air supply opening 70 is blown is set to be within the range of 0° to 10° in order to support the bubble in cooperation with the air from the first air supply opening.

Since the inclined angle Y of the guide plate is set to be within the range of 60° to 89°, the tapered section of the bubble can be expanded in a desired shape along the guide plate 68, so that necking is prevented.

The present invention is not limited to the particular embodiments described above; various other changes and modifications may be made within the spirit and scope of the present invention.

For example, in the embodiment described above, the bubble is taken off in the opposite direction to that of gravity. However, similar effects may be obtained with an apparatus wherein the bubble is taken off in a different direction such as a direction along the direction of gravity or the horizontal direction.

In the embodiment described above, the first external air-cooling ring 64 has two air supply openings 70 and 72. However, a plurality of air supply openings may be formed between the first and second air supply openings 70 and 72 to obtain the similar effects.

In the embodiment described above, a draft ring to remove the air with degraded cooling function is arranged below the second external air-cooling ring. However, the present invention is not limited to this; the draft ring may be omitted. In this case, the air with degraded cooling function is blocked by the box body defining the second external air-cooling ring and is removed to outside the bubble.

Similar effects may also be obtained by incorporating a plurality of external air-cooling rings between the first and second external air-cooling rings. In this case, since the bubble can be cooled stepwise, it may be cooled efficiently. Furthermore, since the total amount of the cooling air can be distributed uniformly to the respective external air-cooling rings, the air velocity from each external air-cooling ring can be decreased to the minimum. Accordingly, flapping of the bubble which is caused by the force of air acting on the bubble may be further prevented.

What is claimed is:

1. An apparatus for forming a thermoplastic resin having a melt tension of not more than 4 g into a tubular bubble having inner and outer circumferential surfaces, comprising:
   supplying means for supplying the molten resin;
   extruding means for extruding the supplied molten resin into a form of the tubular bubble;
   first cooling means for cooling the bubble by supplying a gas toward the inner circumferential surface of the bubble in the molten state and in the extruding direction of said molten resin;
   second cooling means and facing said first cooling means, disposed in the vicinity of both said extruding means and said first cooling means, for cooling the bubble in the molten state, said second cooling means which includes guiding means having an inner surface, an inlet port and an outlet port, the inner surface of said guiding means defining a space into which the molten bubble is extruded by said extruding means, and the bubble being guided along the inner surface thereof from the inlet port toward an outlet port, first gas supplying means for supplying the gas from said inlet port along the inner surface of said guiding means, and second gas supplying means for supplying the gas from said outlet port toward the outer circumferential surface of the bubble;
   third cooling means for cooling the bubble by supplying the gas to the molten bubble which is cooled by said first and second cooling means, thereby the bubble being solidified; and
   regulating means for regulating the gas flow along the outer circumferential surface of the bubble, which is interposed between said second and third cooling means.

2. An apparatus according to claim 1, wherein said first cooling means has a first hole which opens toward said inlet port, which is formed in an annular shape and through which the gas is supplied.

3. An apparatus according to claim 2, wherein the axis of said first hole is inclined at 30° to 75° to an axis of the bubble.

4. An apparatus according to claim 3, wherein said first gas supplying means has a second hole which is formed in an annular shape along said inlet port and through which the gas is supplied.

5. An apparatus according to claim 4, wherein the axis of said second hole is inclined at 0° to 10° to the axis of the bubble.

6. An apparatus according to claim 5, wherein said second gas supplying means has a third hole which is formed in an annular shape along said outlet port and through which the gas is supplied.

7. An apparatus according to claim 6, wherein said third hole is formed such that the axis of the bubble and an axis of said third hole together form an angle of 70° to 90°.

8. An apparatus according to claim 7, wherein a ratio of a flow rate of the gas supplied by said first cooling means to a flow rate of the gas supplied by said second gas supplying means is set to be within a range of 1:2 to 2:1.

9. An apparatus according to claim 8, wherein the inner surface of said guiding means is smooth and forms an angle of 60° to 89° with a reference line perpendicular to the axis of the bubble.

10. An apparatus according to claim 1, wherein said third cooling means has a draft element which drafts the gas supplied by said second cooling means before said third cooling means supplies the gas to the bubble.

11. An apparatus according to claim 1, wherein said regulating means has an annular ring which is arranged along the outer circumferential surface of the bubble, and a plurality of blades provided in said ring which are capable of reciprocating toward and away from the outer circumferential surface of the bubble upon pivotal movement of said ring.

12. An apparatus according to claim 1, wherein the gas is air.

13. A method for forming a thermoplastic resin having a melt tension of not more than 4 g into a tubular bubble having inner and outer circumferential surfaces, comprising:

a step of supplying the molten resin;

a step of extruding the supplied molten resin into a form of the tubular bubble;

a first cooling step of cooling the bubble by supplying a gas toward the inner circumferential surface of the bubble in the molten state;

a second cooling step of cooling the bubble in the molten state and in the extruding direction of said molten resin, said second cooling step including a first gas supplying step for supplying the gas along an extending direction of the outer circumferential surface of the molten bubble so as to cool and guide the bubble, and a second gas supplying step for supplying the gas toward the bubble to cool the bubble while maintaining a diameter of the bubble constant;

a third cooling step of cooling the bubble by supplying the gas to the molten bubble which is cooled by said first and second cooling means, thereby the bubble being solidified; and a step for regulating the gas flow along the outer circumferential surface of the bubble which is interposed between said second and third cooling steps.

14. A method according to claim 13, wherein said first cooling step comprises a step of supplying the gas in a direction at an angle of 30° to 75° with respect to an axis of the bubble.

15. A method according to claim 14, wherein said first gas supplying step comprises a step of supplying the gas in a direction at an angle of 0° to 10° with respect to the axis of the bubble.

16. A method according to claim 15, wherein said second cooling step comprises a step of supplying the gas in a direction at an angle of 70° to 90° with respect to the axis of the bubble.

17. A method according to claim 16, wherein the gas is supplied such that a ratio of a flow rate of the gas supplied in said first cooling step to a flow rate of the gas supplied in said second cooling step is within a range of 1:2 to 2:1.

18. A method according to claim 17, wherein said third cooling step further comprises a drafting step for drafting the gas supplied in said second cooling step before supplying the gas in said third cooling step.

19. A method according to claim 13, wherein the gas is air.

* * * * *